United States Patent
Line et al.

(10) Patent No.: US 9,849,817 B2
(45) Date of Patent: Dec. 26, 2017

(54) COMPOSITE SEAT STRUCTURE

(71) Applicant: Ford Global Technologies, LLC, Dearborn, MI (US)

(72) Inventors: Johnathan Andrew Line, Northville, MI (US); S. M. Akbar Berry, Windsor (CA); Marcos Silva Kondrad, Macomb Township, MI (US); Carol Casey, Dearborn, MI (US); David Andree, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 15/071,947

(22) Filed: Mar. 16, 2016

(65) Prior Publication Data
US 2017/0267147 A1    Sep. 21, 2017

(51) Int. Cl.
*B60N 2/70* (2006.01)
*B60N 2/427* (2006.01)
*B60N 2/44* (2006.01)
*B60N 2/68* (2006.01)

(52) U.S. Cl.
CPC ....... *B60N 2/7094* (2013.01); *B60N 2/42709* (2013.01); *B60N 2/449* (2013.01); *B60N 2/68* (2013.01); *B60N 2/682* (2013.01); *B60N 2/686* (2013.01)

(58) Field of Classification Search
None
See application file for complete search history.

(56) References Cited

U.S. PATENT DOCUMENTS

| 616,178 A | 12/1898 | Barron |
|---|---|---|
| 771,773 A | 10/1904 | Feely |
| 1,125,155 A | 1/1915 | Nunn |
| 2,272,505 A | 2/1942 | Biggs |

(Continued)

FOREIGN PATENT DOCUMENTS

| CN | 201650491 U | 11/2010 |
|---|---|---|
| CN | 203097995 U | 7/2013 |

(Continued)

OTHER PUBLICATIONS

M. Grujicic et al., "Seat-cushion and soft-tissue material modeling and a finite element investigation of the seating aomfort for passenger-vehicle occupants," Materials and Design 30 (2009) 4273-4285.

(Continued)

*Primary Examiner* — David E Allred
(74) *Attorney, Agent, or Firm* — Vichit Chea; Price Heneveld LLP

(57) ABSTRACT

A vehicle seating assembly is provided that includes a seatback and a seat base operably connected to the seatback. The seat base includes a seat base frame having a rear tube extending laterally between at least two side members, a seat cushion assembly, and a composite seat pan positioned between the seat cushion assembly and the seat base frame and having a plurality of recessed features configured to couple over the rear tube and side members. The seat pan integrally defines a flexible cross bar extending laterally between the recessed features. A plurality of hooks integrally defined by the seat pan are operably coupled to the seat cushion assembly.

12 Claims, 6 Drawing Sheets

(56) References Cited

U.S. PATENT DOCUMENTS

| | | | |
|---|---|---|---|
| 2,661,050 A | 12/1953 | Felter |
| 2,725,921 A | 12/1955 | Markin |
| 2,834,606 A | 5/1958 | Bertrand |
| 2,938,570 A | 5/1960 | Flajole |
| 2,958,369 A | 11/1960 | Pitts et al. |
| 3,007,738 A | 11/1961 | Gardel et al. |
| 3,018,133 A | 1/1962 | Mills |
| 3,273,877 A | 9/1966 | Geller et al. |
| 3,330,598 A | 7/1967 | Whiteside |
| 3,403,938 A | 10/1968 | Cramer et al. |
| 3,481,327 A | 12/1969 | Drennen |
| 3,512,605 A | 5/1970 | McCorkle |
| 3,520,327 A | 7/1970 | Claydon et al. |
| 3,550,953 A | 12/1970 | Neale |
| 3,592,508 A | 7/1971 | Druseikis |
| 3,612,607 A | 10/1971 | Lahr |
| 3,632,166 A | 1/1972 | Lahr |
| 3,663,057 A | 5/1972 | Lahr et al. |
| 3,669,492 A | 6/1972 | Peterson |
| 3,779,577 A | 12/1973 | Vvilfert |
| 3,792,897 A | 2/1974 | Alson |
| 3,795,021 A | 3/1974 | Moniot |
| 3,813,151 A | 5/1974 | Cadiou |
| 3,833,257 A | 9/1974 | Dove |
| 3,877,749 A | 4/1975 | Sakurai et al. |
| 3,880,462 A | 4/1975 | Mednick |
| 3,883,173 A | 5/1975 | Shephard et al. |
| 3,885,831 A | 5/1975 | Rasmussen |
| 3,915,421 A | 10/1975 | Le Forestier |
| 3,929,374 A | 12/1975 | Hogan et al. |
| 4,017,118 A | 4/1977 | Cawley |
| 4,018,477 A | 4/1977 | Hogan |
| 4,058,342 A | 11/1977 | Ettridge |
| 4,115,170 A | 9/1978 | Sanson |
| 4,190,286 A | 2/1980 | Bentley |
| 4,205,877 A | 6/1980 | Ettridge |
| 4,225,989 A | 10/1980 | Corbett et al. |
| 4,306,322 A | 12/1981 | Young et al. |
| 4,324,431 A | 4/1982 | Murphy et al. |
| 4,334,709 A | 6/1982 | Akiyama et al. |
| 4,353,595 A | 10/1982 | Kaneko et al. |
| 4,366,985 A | 1/1983 | Leffler |
| 4,415,203 A | 11/1983 | Cawley |
| 4,440,443 A | 4/1984 | Nordskog |
| 4,444,430 A | 4/1984 | Yoshida et al. |
| 4,452,485 A | 6/1984 | Schuster |
| 4,467,484 A | 8/1984 | Nagatake et al. |
| 4,491,364 A | 1/1985 | Hattori et al. |
| 4,491,365 A | 1/1985 | Murakami |
| 4,518,201 A | 5/1985 | Vvahlmann et al. |
| 4,522,445 A | 6/1985 | Goldner et al. |
| 4,541,669 A | 9/1985 | Goldner |
| 4,580,837 A | 4/1986 | Bayley |
| 4,583,255 A | 4/1986 | Mogaki et al. |
| 4,583,781 A | 4/1986 | Hatsutta et al. |
| 4,592,588 A | 6/1986 | (Sono et al. |
| 4,609,221 A | 9/1986 | Bottcher |
| 4,616,676 A | 10/1986 | Adams et al. |
| 4,616,874 A | 10/1986 | Pietsch et al. |
| 4,629,248 A | 12/1986 | Mawbey |
| 4,629,253 A | 12/1986 | Williams |
| 4,634,179 A | 1/1987 | Hashimoto et al. |
| 4,655,505 A | 4/1987 | Kashiwamura et al. |
| 4,664,444 A | 5/1987 | Murphy |
| 4,668,014 A | 5/1987 | Baisset |
| 4,693,513 A | 9/1987 | Heath |
| 4,707,027 A | 11/1987 | Horvath et al. |
| 4,718,723 A | 1/1988 | Battemiller |
| 4,720,141 A | 1/1988 | Sakamoto et al. |
| 4,720,146 A | 1/1988 | Mawbey et al. |
| 4,726,086 A | 2/1988 | McEvoy |
| 4,752,982 A | 6/1988 | Jones et al. |
| 4,753,479 A | 6/1988 | Hatsutta et al. |
| 4,767,155 A | 8/1988 | Kousaka et al. |
| 4,773,703 A | 9/1988 | Krugener et al. |
| 4,775,185 A | 10/1988 | Scholin et al. |
| 4,781,413 A | 11/1988 | Shumack, Jr. |
| 4,790,592 A | 12/1988 | Busso et al. |
| 4,792,186 A | 12/1988 | Benjamin et al. |
| 4,796,313 A | 1/1989 | Dimatteo et al. |
| 4,822,092 A | 4/1989 | Sweers |
| 4,833,614 A | 5/1989 | Saitoh et al. |
| 4,840,429 A | 6/1989 | Stockl |
| 4,856,844 A | 8/1989 | Lsono |
| 4,858,992 A | 8/1989 | Lasota |
| 4,861,104 A | 8/1989 | Malak |
| 4,884,843 A | 12/1989 | Derees |
| 4,893,367 A | 1/1990 | Heimreid et al. |
| 4,915,447 A | 4/1990 | Shovar |
| 4,938,529 A | 7/1990 | Fourrey |
| 4,965,899 A | 10/1990 | Sekido |
| 4,966,410 A | 10/1990 | Bishai |
| 4,971,380 A | 11/1990 | Cote et al. |
| 5,013,089 A | 5/1991 | Abu-Isa et al. |
| 5,018,790 A | 5/1991 | Jay |
| 5,020,852 A | 6/1991 | Marion |
| 5,050,930 A | 9/1991 | Schuster et al. |
| 5,054,845 A | 10/1991 | Vogel |
| 5,054,856 A | 10/1991 | Wang |
| 5,067,772 A | 11/1991 | Koa |
| 5,082,326 A | 1/1992 | Sekido et al. |
| 5,096,529 A | 3/1992 | Baker |
| 5,104,189 A | 4/1992 | Hanai et al. |
| 5,108,150 A | 4/1992 | Stas et al. |
| 5,112,018 A | 5/1992 | Vvahls |
| 5,120,109 A | 6/1992 | Rangoni |
| 5,127,708 A | 7/1992 | Kishi |
| 5,129,704 A | 7/1992 | Kishi |
| 5,145,232 A | 9/1992 | Dal Monte |
| 5,171,062 A | 12/1992 | Courtois |
| 5,174,526 A | 12/1992 | Kanigowski |
| 5,186,494 A | 2/1993 | Shimose |
| 5,190,348 A | 3/1993 | Colasanti |
| 5,203,608 A | 4/1993 | Tame |
| 5,222,784 A | 6/1993 | Hamelin |
| 5,243,722 A | 9/1993 | Gusakov |
| 5,263,765 A | 11/1993 | Nagashima et al. |
| 5,285,754 A | 2/1994 | Bell |
| 5,318,344 A | 6/1994 | Wang |
| 5,320,409 A | 6/1994 | Katoh et al. |
| 5,323,740 A | 6/1994 | Daily et al. |
| 5,364,164 A | 11/1994 | Kuranami |
| 5,370,443 A | 12/1994 | Maruyama |
| 5,375,569 A | 12/1994 | Santella |
| 5,380,063 A | 1/1995 | Dauphin |
| 5,443,303 A | 8/1995 | Bauer et al. |
| 5,458,365 A | 10/1995 | Rogers et al. |
| 5,518,294 A | 5/1996 | Ligon, Sr. et al. |
| 5,544,942 A * | 8/1996 | Vu Khac .......... A47C 7/18 297/452.27 |
| 5,547,214 A | 8/1996 | Zimmerman, II et al. |
| 5,560,681 A | 10/1996 | Dixon et al. |
| 5,570,716 A | 11/1996 | Kamen et al. |
| 5,588,708 A | 12/1996 | Rykken et al. |
| 5,597,203 A | 1/1997 | Hubbard |
| 5,609,394 A | 3/1997 | Ligon, Sr. et al. |
| 5,647,635 A | 7/1997 | Aumond et al. |
| 5,658,050 A | 8/1997 | Lorbiecki |
| 5,662,384 A | 9/1997 | O'Neill et al. |
| 5,678,891 A | 10/1997 | O'Neill et al. |
| 5,681,084 A | 10/1997 | Yoneda |
| 5,690,387 A | 11/1997 | Sarti |
| 5,692,802 A | 12/1997 | Aufrere et al. |
| 5,707,109 A | 1/1998 | Massara et al. |
| 5,738,368 A | 4/1998 | Hammond et al. |
| 5,755,493 A | 5/1998 | Kodaverdian |
| 5,758,924 A | 6/1998 | Vishey |
| 5,769,489 A | 6/1998 | Dellanno |
| 5,772,280 A | 6/1998 | Massara |
| 5,775,778 A | 7/1998 | Riley et al. |
| 5,785,669 A | 7/1998 | Proctor et al. |
| 5,799,971 A | 9/1998 | Asada |
| 5,803,490 A | 9/1998 | Seventko et al. |
| 5,815,393 A | 9/1998 | Chae |

(56) References Cited

U.S. PATENT DOCUMENTS

| | | |
|---|---|---|
| 5,823,620 A | 10/1998 | Le Caz |
| 5,826,938 A | 10/1998 | Yanase et al. |
| 5,836,648 A | 11/1998 | Karschin et al. |
| 5,860,699 A | 1/1999 | Weeks |
| 5,863,092 A | 1/1999 | Kifer |
| 5,868,450 A | 2/1999 | Hashimoto |
| 5,882,073 A | 3/1999 | Burchi et al. |
| 5,893,609 A | 4/1999 | Schmidt |
| 5,895,070 A | 4/1999 | Crimmins et al. |
| 5,902,014 A | 5/1999 | Dinkel et al. |
| 5,906,586 A | 5/1999 | Graham |
| 5,913,568 A | 6/1999 | Brightbill et al. |
| 5,944,341 A | 8/1999 | Kimura et al. |
| 5,951,039 A | 9/1999 | Severinski et al. |
| 5,967,608 A | 10/1999 | Van Sickle |
| 5,975,629 A | 11/1999 | Lorbiecki |
| 5,975,637 A | 11/1999 | Geuss et al. |
| 5,979,985 A | 11/1999 | Bauer et al. |
| 5,983,940 A | 11/1999 | Smith |
| 5,988,674 A | 11/1999 | Kimura et al. |
| 6,019,387 A | 2/2000 | Jost |
| 6,024,378 A | 2/2000 | Fu |
| 6,024,406 A | 2/2000 | Charras et al. |
| 6,030,040 A | 2/2000 | Schmid et al. |
| 6,050,635 A | 4/2000 | Pajon et al. |
| 6,056,366 A | 5/2000 | Haynes et al. |
| 6,062,642 A | 5/2000 | Sinnhuber et al. |
| 6,068,339 A | 5/2000 | Linzalone |
| 6,079,781 A | 6/2000 | Tilley |
| 6,088,642 A | 7/2000 | Finkelstein et al. |
| 6,106,071 A | 8/2000 | Aebischer et al. |
| 6,106,163 A | 8/2000 | Inana et al. |
| 6,109,690 A | 8/2000 | Vvu et al. |
| 6,145,925 A | 11/2000 | Eksin et al. |
| 6,155,593 A | 12/2000 | Kimura et al. |
| 6,158,812 A | 12/2000 | Bonke |
| 6,161,231 A | 12/2000 | Kraft et al. |
| 6,179,379 B1 | 1/2001 | Andersson |
| 6,189,966 B1 | 2/2001 | Faust et al. |
| 6,196,627 B1 | 3/2001 | Faust et al. |
| 6,199,252 B1 | 3/2001 | Masters et al. |
| 6,199,900 B1 | 3/2001 | Zeigler |
| 6,199,951 B1 | 3/2001 | Zeile et al. |
| 6,203,105 B1 | 3/2001 | Rhodes, Jr. |
| 6,206,466 B1 | 3/2001 | Komatsu |
| 6,217,062 B1 | 4/2001 | Breyvogel et al. |
| 6,217,118 B1 | 4/2001 | Heilig |
| 6,220,661 B1 | 4/2001 | Peterson |
| 6,224,150 B1 | 5/2001 | Eksin et al. |
| 6,231,068 B1 | 5/2001 | White, Jr. et al. |
| 6,234,518 B1 | 5/2001 | Ryl et al. |
| 6,273,810 B1 | 8/2001 | Rhodes, Jr. et al. |
| 6,296,308 B1 | 10/2001 | Cosentino et al. |
| 6,302,431 B1 | 10/2001 | Sasaki et al. |
| 6,312,050 B1 | 11/2001 | Eklind |
| 6,341,797 B1 | 1/2002 | Sea |
| 6,349,993 B1 | 2/2002 | Walsh |
| 6,352,304 B1 | 3/2002 | Sorgenfrei |
| 6,352,310 B1 | 3/2002 | Schmidt et al. |
| 6,357,066 B1 | 3/2002 | Pierce |
| 6,357,789 B1 | 3/2002 | Harada et al. |
| 6,357,827 B1 | 3/2002 | Brightbill et al. |
| 6,364,414 B1 | 4/2002 | Specht |
| 6,375,269 B1 | 4/2002 | Maeda et al. |
| 6,382,720 B1 | 5/2002 | Franklin et al. |
| 6,386,577 B1 | 5/2002 | Kan et al. |
| 6,390,557 B1 | 5/2002 | Asano |
| 6,394,525 B1 | 5/2002 | Seibold |
| 6,394,546 B1 | 5/2002 | Knoblock et al. |
| 6,398,299 B1 | 6/2002 | Angerer et al. |
| 6,398,306 B1 | 6/2002 | MacK |
| 6,419,317 B1 | 7/2002 | Vvestrich et al. |
| 6,425,602 B1 | 7/2002 | Al-Amin et al. |
| 6,431,734 B1 | 8/2002 | Curry |
| 6,439,597 B1 | 8/2002 | Harada et al. |
| 6,450,571 B1 | 9/2002 | Canni et al. |
| 6,454,353 B1 | 9/2002 | Knaus |
| 6,457,741 B2 | 10/2002 | Seki et al. |
| 6,474,733 B1 | 11/2002 | Heilig et al. |
| 6,523,892 B1 | 2/2003 | Masayuki Kage et al. |
| 6,523,902 B2 | 2/2003 | Robinson |
| 6,530,622 B1 | 3/2003 | Ekern et al. |
| 6,550,856 B1 | 4/2003 | Ganser et al. |
| 6,554,365 B2 | 4/2003 | Karschin et al. |
| 6,557,887 B2 | 5/2003 | Vvohllebe |
| 6,561,540 B1 | 5/2003 | Hasegawa et al. |
| 6,565,150 B2 | 5/2003 | Fischer et al. |
| 6,565,153 B2 | 5/2003 | Hensel et al. |
| 6,568,754 B1 | 5/2003 | Norton et al. |
| 6,578,911 B2 | 6/2003 | Harada et al. |
| 6,588,838 B1 | 7/2003 | Dick, Jr. et al. |
| 6,612,610 B1 | 9/2003 | Aoki et al. |
| 6,616,177 B2 | 9/2003 | Thomas et al. |
| 6,619,605 B2 | 9/2003 | Lambert |
| 6,619,737 B2 | 9/2003 | Kunkel et al. |
| 6,629,715 B2 | 10/2003 | Oh et al. |
| 6,637,818 B2 | 10/2003 | Williams |
| 6,672,666 B2 | 1/2004 | Stiller et al. |
| 6,682,059 B1 | 1/2004 | Daniels et al. |
| 6,682,140 B2 | 1/2004 | Minuth et al. |
| 6,695,406 B2 | 2/2004 | Plant |
| 6,698,832 B2 | 3/2004 | Boudinot |
| 6,719,373 B2 | 4/2004 | Zimmermann |
| 6,726,280 B1 | 4/2004 | Liao |
| 6,733,064 B2 | 5/2004 | Fox et al. |
| 6,736,452 B2 | 5/2004 | Aoki et al. |
| 6,746,077 B2 | 6/2004 | Klukowski |
| 6,758,522 B2 | 7/2004 | Ligon, Sr. et al. |
| 6,779,560 B1 | 8/2004 | Reis |
| 6,786,542 B1 | 9/2004 | Nuzzarello |
| 6,802,563 B1 | 10/2004 | Mysliwiec et al. |
| 6,808,230 B2 | 10/2004 | Buss et al. |
| 6,811,219 B2 | 11/2004 | Hudswell et al. |
| 6,820,640 B2 | 11/2004 | Hand et al. |
| 6,820,930 B2 | 11/2004 | Dellanno |
| 6,824,212 B2 | 11/2004 | Malsch et al. |
| 6,848,742 B1 | 2/2005 | Aoki et al. |
| 6,854,869 B1 | 2/2005 | Fernandez |
| 6,860,559 B2 | 3/2005 | Schuster, Sr. et al. |
| 6,860,564 B2 | 3/2005 | Reed et al. |
| 6,866,339 B2 | 3/2005 | Keishirou Rah |
| 6,869,140 B2 | 3/2005 | White et al. |
| 6,890,029 B2 | 5/2005 | Svantesson |
| 6,890,030 B2 | 5/2005 | Wilkerson et al. |
| 6,899,399 B2 | 5/2005 | Ali et al. |
| 6,908,151 B2 | 6/2005 | Meeker et al. |
| 6,912,748 B2 | 7/2005 | Vansickle |
| 6,938,953 B2 | 9/2005 | Yngve Haland et al. |
| 6,955,399 B2 | 10/2005 | Hong |
| 6,962,392 B2 | 11/2005 | O'Connor |
| 6,988,770 B2 | 1/2006 | Witchie |
| 6,991,256 B2 | 1/2006 | Henderson et al. |
| 6,991,289 B2 | 1/2006 | House |
| 6,997,473 B2 | 2/2006 | Tanase et al. |
| 7,025,423 B2 | 4/2006 | Fujita et al. |
| 7,040,699 B2 | 5/2006 | Curran et al. |
| 7,055,904 B2 | 6/2006 | Skelly et al. |
| 7,059,678 B1 | 6/2006 | Taylor |
| 7,072,764 B2 | 7/2006 | Donath et al. |
| 7,093,898 B2 | 8/2006 | Ladron De Guevara |
| 7,100,978 B2 | 9/2006 | Ekern et al. |
| 7,100,992 B2 | 9/2006 | Bargheer et al. |
| 7,108,322 B2 | 9/2006 | Erker |
| 7,111,901 B2 | 9/2006 | Schlierf et al. |
| 7,125,077 B2 | 10/2006 | Frank |
| 7,131,694 B1 | 11/2006 | Buffa |
| 7,131,756 B2 | 11/2006 | Leslie et al. |
| 7,134,686 B2 | 11/2006 | Tracht et al. |
| 7,140,682 B2 | 11/2006 | Jaeger et al. |
| 7,152,920 B2 | 12/2006 | Sugiyama et al. |
| 7,159,934 B2 | 1/2007 | Farquhar et al. |
| 7,159,938 B1 | 1/2007 | Shiraishi |
| 7,185,950 B2 | 3/2007 | Pettersson et al. |
| 7,195,274 B2 | 3/2007 | Tracht |

(56) References Cited

U.S. PATENT DOCUMENTS

| | | |
|---|---|---|
| 7,195,277 B2 | 3/2007 | Tracht et al. |
| 7,213,876 B2 | 5/2007 | Stoewe |
| 7,213,883 B2 | 5/2007 | Charnitski |
| 7,216,915 B2 | 5/2007 | Kammerer et al. |
| 7,229,118 B2 | 6/2007 | Saberan et al. |
| 7,229,129 B2 | 6/2007 | White et al. |
| 7,234,771 B2 | 6/2007 | Nakhla |
| 7,261,371 B2 | 8/2007 | Thunissen et al. |
| 7,267,363 B2 | 9/2007 | Tredez |
| 7,284,768 B2 | 10/2007 | Tracht |
| 7,290,791 B2 | 11/2007 | Tracht |
| 7,293,831 B2 | 11/2007 | Greene |
| 7,311,681 B1 | 12/2007 | Vaccarella |
| 7,316,215 B1 | 1/2008 | Nino et al. |
| 7,322,651 B2 | 1/2008 | Makhsous et al. |
| 7,325,878 B1 | 2/2008 | Dehli |
| 7,341,309 B2 | 3/2008 | Penley et al. |
| 7,344,189 B2 | 3/2008 | Reed et al. |
| 7,347,444 B2 | 3/2008 | Wheelwright |
| 7,350,803 B2 | 4/2008 | Abramczyk et al. |
| 7,350,859 B2 | 4/2008 | Klukowski |
| 7,350,865 B2 | 4/2008 | Pearse |
| 7,357,412 B2 | 4/2008 | Tracht et al. |
| 7,357,454 B2 | 4/2008 | Schiener et al. |
| 7,382,240 B2 | 6/2008 | Egelhaaf |
| 7,387,339 B2 | 6/2008 | Bykov et al. |
| 7,393,005 B2 | 7/2008 | Inazu et al. |
| 7,401,852 B2 | 7/2008 | Humer et al. |
| 7,413,253 B2 | 8/2008 | Karlberg |
| 7,425,034 B2 | 9/2008 | Bajic et al. |
| 7,441,797 B2 | 10/2008 | Tracht et al. |
| 7,441,838 B2 | 10/2008 | Patwardhan |
| 7,445,292 B2 | 11/2008 | Moule |
| 7,467,823 B2 | 12/2008 | Hartwich |
| 7,478,869 B2 | 1/2009 | Lazanja et al. |
| 7,481,489 B2 | 1/2009 | Demick |
| 7,488,040 B2 | 2/2009 | Dozsa-Farkas |
| 7,506,924 B2 | 3/2009 | Bargheer et al. |
| 7,506,938 B2 | 3/2009 | Brennan et al. |
| 7,517,015 B2 | 4/2009 | Terada et al. |
| 7,517,024 B2 | 4/2009 | Cvek |
| 7,523,888 B2 | 4/2009 | Ferry et al. |
| 7,530,633 B2 | 5/2009 | Yokota et al. |
| 7,540,529 B2 | 6/2009 | Tracht et al. |
| 7,543,888 B2 | 6/2009 | Kuno |
| 7,547,068 B2 | 6/2009 | Davis |
| 7,562,934 B2 | 7/2009 | Swan et al. |
| 7,578,552 B2 | 8/2009 | Bajic et al. |
| 7,578,554 B2 | 8/2009 | Lee et al. |
| 7,597,398 B2 | 10/2009 | Lindsay |
| 7,604,294 B2 | 10/2009 | Jane Santamaria |
| 7,611,199 B2 | 11/2009 | Michalak et al. |
| 7,614,693 B2 | 11/2009 | Ito |
| 7,637,568 B2 | 12/2009 | Meeker et al. |
| 7,640,090 B2 | 12/2009 | Uchida et al. |
| 7,641,281 B2 | 1/2010 | Grimm |
| 7,668,329 B2 | 2/2010 | Matsuhashi |
| 7,669,888 B2 | 3/2010 | Sato et al. |
| 7,669,925 B2 | 3/2010 | Beck et al. |
| 7,669,928 B2 | 3/2010 | Snyder |
| 7,669,929 B2 | 3/2010 | Simon et al. |
| 7,677,594 B2 | 3/2010 | Hazlewood et al. |
| 7,677,598 B1 | 3/2010 | Ryan et al. |
| 7,699,339 B2 | 4/2010 | Jang et al. |
| 7,712,833 B2 | 5/2010 | Ueda |
| 7,717,459 B2 | 5/2010 | Bostrom et al. |
| 7,726,733 B2 | 6/2010 | Balser et al. |
| 7,735,932 B2 | 6/2010 | Lazanja et al. |
| 7,752,720 B2 | 7/2010 | Smith |
| 7,753,451 B2 | 7/2010 | Maebert et al. |
| 7,775,552 B2 | 8/2010 | Breuninger et al. |
| 7,775,602 B2 | 8/2010 | Lazanja et al. |
| 7,784,819 B2 | 8/2010 | Lawall et al. |
| 7,784,863 B2 | 8/2010 | Fallen |
| 7,793,973 B2 | 9/2010 | Sato et al. |
| 7,794,012 B2 | 9/2010 | Szablewski |
| 7,798,570 B2 | 9/2010 | Kwiecinski et al. |
| 7,802,809 B2 | 9/2010 | Ryan et al. |
| 7,802,843 B2 | 9/2010 | Andersson et al. |
| 7,810,969 B2 | 10/2010 | Blackmore et al. |
| 7,819,470 B2 | 10/2010 | Humer et al. |
| 7,819,480 B2 | 10/2010 | Asbury et al. |
| 7,823,971 B2 | 11/2010 | Humer et al. |
| 7,845,729 B2 | 12/2010 | Yamada et al. |
| 7,850,235 B2 | 12/2010 | Veine et al. |
| 7,850,247 B2 | 12/2010 | Stauske et al. |
| 7,857,381 B2 | 12/2010 | Humer et al. |
| 7,862,113 B2 | 1/2011 | Knoll |
| 7,862,117 B2 | 1/2011 | Hutchinson et al. |
| 7,866,689 B2 | 1/2011 | Saberan |
| 7,871,126 B2 | 1/2011 | Becker et al. |
| 7,871,129 B2 | 1/2011 | Boes et al. |
| 7,878,535 B2 | 2/2011 | Rose et al. |
| 7,878,596 B2 | 2/2011 | Brunner et al. |
| 7,887,094 B2 | 2/2011 | Sakaida |
| 7,891,701 B2 | 2/2011 | Tracht et al. |
| 7,909,360 B2 | 3/2011 | Marriott et al. |
| 7,909,401 B2 | 3/2011 | Hofmann et al. |
| 7,909,403 B2 | 3/2011 | Lawall et al. |
| 7,926,871 B2 | 4/2011 | Meixner et al. |
| 7,926,872 B2 | 4/2011 | Chida et al. |
| 7,931,294 B2 | 4/2011 | Okada et al. |
| 7,931,330 B2 | 4/2011 | Itou et al. |
| 7,938,440 B2 | 5/2011 | Kataoka et al. |
| 7,946,649 B2 | 5/2011 | Galbreath et al. |
| 7,959,225 B2 | 6/2011 | Humer et al. |
| 7,959,226 B2 | 6/2011 | Hattori et al. |
| 7,963,553 B2 | 6/2011 | Huynh et al. |
| 7,963,595 B2 | 6/2011 | Ito et al. |
| 7,963,600 B2 | 6/2011 | Alexander et al. |
| 7,966,835 B2 | 6/2011 | Petrovski |
| 7,967,379 B2 | 6/2011 | Walters et al. |
| 7,971,931 B2 | 7/2011 | Lazanja et al. |
| 7,971,937 B2 | 7/2011 | Ishii et al. |
| 8,011,726 B2 | 9/2011 | Omori et al. |
| 8,011,728 B2 | 9/2011 | Kohl et al. |
| 8,016,355 B2 | 9/2011 | Ito et al. |
| 8,029,055 B2 | 10/2011 | Hartlaub |
| 8,038,222 B2 | 10/2011 | Lein et al. |
| 8,056,923 B2 | 11/2011 | Shimono |
| 8,075,053 B2 | 12/2011 | Tracht et al. |
| 8,100,471 B2 | 1/2012 | Lawall et al. |
| 8,109,569 B2 | 2/2012 | Mitchell |
| 8,111,147 B2 | 2/2012 | Litkouhi |
| 8,113,539 B2 | 2/2012 | Paruszkiewicz et al. |
| 8,123,246 B2 | 2/2012 | Gilbert et al. |
| 8,123,296 B2 | 2/2012 | Rager et al. |
| 8,126,615 B2 | 2/2012 | McMillen et al. |
| D655,393 S | 3/2012 | Whitaker |
| 8,128,167 B2 | 3/2012 | Zhong et al. |
| 8,141,945 B2 | 3/2012 | Akaike et al. |
| 8,162,391 B2 | 4/2012 | Lazanja et al. |
| 8,162,392 B2 | 4/2012 | Humer et al. |
| 8,162,397 B2 | 4/2012 | Booth et al. |
| 8,167,370 B2 | 5/2012 | Arakawa et al. |
| 8,167,376 B2 | 5/2012 | Song |
| 8,177,256 B2 | 5/2012 | Smith et al. |
| 8,196,887 B2 | 6/2012 | Dahlbacka et al. |
| 8,201,883 B2 | 6/2012 | Vvuerstlein et al. |
| 8,210,568 B2 | 7/2012 | Ryden et al. |
| 8,210,605 B2 | 7/2012 | Hough et al. |
| 8,210,611 B2 | 7/2012 | Aldrich et al. |
| 8,226,113 B2 | 7/2012 | Yamashita |
| 8,226,165 B2 | 7/2012 | Mizoi |
| 8,231,138 B2 | 7/2012 | Sadr et al. |
| 8,240,758 B2 | 8/2012 | Combest |
| 8,251,396 B2 | 8/2012 | Zothke et al. |
| 8,297,708 B2 | 10/2012 | Mizobata et al. |
| 8,328,227 B2 | 12/2012 | Shimono |
| 8,328,231 B2 | 12/2012 | Nakamura et al. |
| 8,336,910 B1 | 12/2012 | Kalisz et al. |
| 8,342,607 B2 | 1/2013 | Hofmann et al. |
| 8,348,338 B2 | 1/2013 | Galecka et al. |
| 8,360,517 B2 | 1/2013 | Lazanja et al. |

(56) References Cited

U.S. PATENT DOCUMENTS

| | | |
|---|---|---|
| 8,360,530 B2 | 1/2013 | Nada et al. |
| 8,371,655 B2 | 2/2013 | Nonomiya |
| 8,388,061 B2 | 3/2013 | Saito et al. |
| 8,397,688 B2 | 3/2013 | Cunningham |
| 8,403,410 B1 | 3/2013 | Pinger et al. |
| 8,408,646 B2 | 4/2013 | Harper et al. |
| 8,447,473 B2 | 5/2013 | Sugiyama et al. |
| 8,469,395 B2 | 6/2013 | Richez et al. |
| 8,474,778 B2 | 7/2013 | Jacobson |
| 8,474,917 B2 | 7/2013 | Line et al. |
| 8,511,748 B2 | 8/2013 | McLeod et al. |
| 8,516,842 B2 | 8/2013 | Petrovski |
| 8,534,760 B2 | 9/2013 | Katz |
| 8,540,318 B2 | 9/2013 | Folkert et al. |
| 8,585,144 B2 | 11/2013 | Huttenhuis |
| 8,590,978 B2 | 11/2013 | Jaranson et al. |
| 8,602,493 B1 | 12/2013 | Chen et al. |
| 8,657,378 B2 | 2/2014 | Kunert et al. |
| 8,678,500 B2 | 3/2014 | Lem et al. |
| 8,690,255 B2 * | 4/2014 | Yamaki ............. B60N 2/4228 297/216.14 |
| 8,696,067 B2 | 4/2014 | Galbreath et al. |
| 8,702,120 B2 | 4/2014 | Kalisz et al. |
| 8,727,374 B1 * | 5/2014 | Line ..................... B60R 21/207 280/728.3 |
| 8,752,894 B2 | 6/2014 | Trimbom et al. |
| 8,782,835 B2 * | 7/2014 | Pozzi ................... B64D 11/06 244/118.6 |
| 8,794,707 B2 | 8/2014 | Bocsanyi et al. |
| 8,807,594 B2 * | 8/2014 | Mizobata ............ B60N 2/6009 280/730.2 |
| 8,827,371 B2 | 9/2014 | Bmcick et al. |
| 8,899,683 B2 | 12/2014 | Ito |
| 8,905,431 B1 | 12/2014 | Line et al. |
| 8,967,663 B2 | 3/2015 | Seki et al. |
| 8,979,204 B2 | 3/2015 | Awata et al. |
| 9,096,157 B2 | 8/2015 | Line et al. |
| 9,126,504 B2 | 9/2015 | Line et al. |
| 9,126,508 B2 | 9/2015 | Line et al. |
| 9,315,131 B2 | 4/2016 | Line et al. |
| 9,771,009 B2 * | 9/2017 | Kijima ..................... B60N 2/72 |
| 2001/0011812 A1 | 8/2001 | Seki et al. |
| 2002/0096915 A1 | 7/2002 | Haupt et al. |
| 2002/0113473 A1 | 8/2002 | Knaus |
| 2002/0145512 A1 | 10/2002 | Sleichter, III et al. |
| 2003/0023363 A1 | 1/2003 | Katz et al. |
| 2003/0025370 A1 | 2/2003 | Hensel et al. |
| 2003/0038517 A1 | 2/2003 | Moran et al. |
| 2003/0137178 A1 | 7/2003 | Craft et al. |
| 2003/0213105 A1 | 11/2003 | Bednarski |
| 2004/0012237 A1 | 1/2004 | Horiki et al. |
| 2004/0084937 A1 | 5/2004 | Berta |
| 2004/0108760 A1 | 6/2004 | McMillen |
| 2004/0129585 A1 | 7/2004 | Ballantine et al. |
| 2004/0144349 A1 | 7/2004 | Vvampula et al. |
| 2004/0183351 A1 | 9/2004 | Johnson et al. |
| 2004/0195870 A1 | 10/2004 | Bohlender et al. |
| 2004/0212589 A1 | 10/2004 | Hall et al. |
| 2005/0035642 A1 | 2/2005 | Hake et al. |
| 2005/0077762 A1 | 4/2005 | Kraemer et al. |
| 2005/0082895 A1 | 4/2005 | Kimmig |
| 2005/0127734 A1 | 6/2005 | Veine et al. |
| 2005/0140193 A1 | 6/2005 | Skelly et al. |
| 2005/0179287 A1 | 8/2005 | Hankins |
| 2005/0179291 A1 | 8/2005 | Brodeur |
| 2005/0184569 A1 | 8/2005 | Penley et al. |
| 2005/0189752 A1 | 9/2005 | Itoga et al. |
| 2005/0200166 A1 | 9/2005 | Noh |
| 2005/0248189 A1 | 11/2005 | Prasatek et al. |
| 2005/0253429 A1 | 11/2005 | Veine et al. |
| 2005/0258624 A1 | 11/2005 | Abraham et al. |
| 2006/0043777 A1 | 3/2006 | Friedman et al. |
| 2006/0113751 A1 | 6/2006 | Tracht et al. |
| 2006/0113762 A1 | 6/2006 | Tracht et al. |
| 2006/0113765 A1 | 6/2006 | Tracht |
| 2006/0152062 A1 | 7/2006 | Archambault et al. |
| 2006/0155429 A1 | 7/2006 | Boone et al. |
| 2006/0214487 A1 | 9/2006 | Holdampf et al. |
| 2006/0220434 A1 | 10/2006 | Schulz et al. |
| 2006/0244301 A1 | 11/2006 | Jeffries |
| 2007/0029853 A1 | 2/2007 | Forgatsch et al. |
| 2007/0090673 A1 | 4/2007 | Ito |
| 2007/0118259 A1 | 5/2007 | Chernoff et al. |
| 2007/0120401 A1 | 5/2007 | Minuth et al. |
| 2007/0138844 A1 | 6/2007 | Kim |
| 2007/0170707 A1 | 7/2007 | Sato et al. |
| 2007/0200398 A1 | 8/2007 | Vvolas et al. |
| 2007/0241593 A1 | 10/2007 | Vvoerner |
| 2007/0296194 A1 | 12/2007 | Ridgway et al. |
| 2008/0036258 A1 | 2/2008 | Holdampf et al. |
| 2008/0067850 A1 | 3/2008 | Stenstrom et al. |
| 2008/0122241 A1 | 5/2008 | Blackmore et al. |
| 2008/0157577 A1 | 7/2008 | Lindsay |
| 2008/0174159 A1 | 7/2008 | Kojima et al. |
| 2008/0231099 A1 | 9/2008 | Szczepkowski et al. |
| 2008/0252111 A1 | 10/2008 | Rothkop et al. |
| 2009/0039690 A1 | 2/2009 | Simon et al. |
| 2009/0066122 A1 | 3/2009 | Minuth et al. |
| 2009/0085383 A1 | 4/2009 | Hicks et al. |
| 2009/0102255 A1 | 4/2009 | D'Agostini et al. |
| 2009/0152909 A1 | 6/2009 | Andersson |
| 2009/0160167 A1 | 6/2009 | Itoga |
| 2009/0165263 A1 | 7/2009 | Smith |
| 2009/0195041 A1 | 8/2009 | Ito et al. |
| 2009/0224584 A1 | 9/2009 | Lawall et al. |
| 2009/0302660 A1 | 12/2009 | Karlberg et al. |
| 2009/0315372 A1 | 12/2009 | Tracht |
| 2009/0322124 A1 | 12/2009 | Barkow et al. |
| 2010/0007122 A1 | 1/2010 | Clauser et al. |
| 2010/0026066 A1 | 2/2010 | Graber et al. |
| 2010/0038937 A1 | 2/2010 | Andersson et al. |
| 2010/0102599 A1 | 4/2010 | Itou et al. |
| 2010/0109397 A1 | 5/2010 | Bandurski et al. |
| 2010/0109401 A1 | 5/2010 | Booth et al. |
| 2010/0117414 A1 | 5/2010 | Hwang et al. |
| 2010/0133794 A1 | 6/2010 | Tracht et al. |
| 2010/0140986 A1 | 6/2010 | Sawada |
| 2010/0140992 A1 | 6/2010 | Yamaguchi |
| 2010/0148546 A1 | 6/2010 | Demontis et al. |
| 2010/0148948 A1 | 6/2010 | Murphy et al. |
| 2010/0171346 A1 | 7/2010 | Laframboise et al. |
| 2010/0187881 A1 | 7/2010 | Fujita et al. |
| 2010/0201167 A1 | 8/2010 | Wieclawski |
| 2010/0207438 A1 | 8/2010 | Inoue et al. |
| 2010/0207443 A1 | 8/2010 | Bmcick |
| 2010/0231013 A1 | 9/2010 | Schlenker |
| 2010/0270840 A1 | 10/2010 | Tanaka et al. |
| 2010/0283229 A1 | 11/2010 | Feller et al. |
| 2010/0286867 A1 | 11/2010 | Bergholz et al. |
| 2010/0301650 A1 | 12/2010 | Hong |
| 2010/0319796 A1 | 12/2010 | Whitaker |
| 2010/0320816 A1 | 12/2010 | Michalak |
| 2010/0327636 A1 | 12/2010 | Stoll et al. |
| 2011/0018498 A1 | 1/2011 | Soar |
| 2011/0055720 A1 | 3/2011 | Potter et al. |
| 2011/0074185 A1 | 3/2011 | Nakaya et al. |
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Bmcick et al. |
| 2011/0133435 A1 | 6/2011 | Sadr et al. |
| 2011/0133525 A1 | 6/2011 | Oota |
| 2011/0155084 A1 | 6/2011 | Sargeant |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0199200 A1 | 8/2011 | Lueke et al. |
| 2011/0215200 A1 | 9/2011 | Mejuhas |
| 2011/0248532 A1 | 10/2011 | Kim et al. |
| 2011/0254335 A1 | 10/2011 | Pradier et al. |
| 2011/0260506 A1 | 10/2011 | Kuno |
| 2011/0260509 A1 | 10/2011 | Siu |

(56) References Cited

U.S. PATENT DOCUMENTS

| | | |
|---|---|---|
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0285194 A1 | 11/2011 | Marom |
| 2011/0298261 A1 | 12/2011 | Holt et al. |
| 2011/0309604 A1 | 12/2011 | Moore et al. |
| 2012/0013161 A1 | 1/2012 | Adams et al. |
| 2012/0032478 A1 | 2/2012 | Friderich et al. |
| 2012/0032486 A1 | 2/2012 | Baker et al. |
| 2012/0037754 A1 | 2/2012 | Kladde |
| 2012/0041648 A1 | 2/2012 | Yamaguchi et al. |
| 2012/0043791 A1 | 2/2012 | Kojima |
| 2012/0049597 A1 | 3/2012 | Brewer et al. |
| 2012/0063081 A1 | 3/2012 | Grunwald |
| 2012/0080914 A1 | 4/2012 | Wang |
| 2012/0081234 A1 | 4/2012 | Shaffer et al. |
| 2012/0081544 A1 | 4/2012 | Wee |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0112515 A1 | 5/2012 | Labish |
| 2012/0119551 A1 | 5/2012 | Bmcick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0161481 A1 | 6/2012 | Tache et al. |
| 2012/0162891 A1 | 6/2012 | Tranchina et al. |
| 2012/0167845 A1 | 7/2012 | Sands et al. |
| 2012/0175924 A1 | 7/2012 | Festag et al. |
| 2012/0187729 A1 | 7/2012 | Fukawatase et al. |
| 2012/0187731 A1 | 7/2012 | Guadagno |
| 2012/0222900 A1 | 9/2012 | Rodney et al. |
| 2012/0248833 A1 | 10/2012 | Hontz et al. |
| 2012/0248839 A1 | 10/2012 | Fujita et al. |
| 2012/0261974 A1 | 10/2012 | Yoshizawa et al. |
| 2012/0267878 A1 | 10/2012 | Kalisz et al. |
| 2012/0299342 A1 | 11/2012 | Mizobata |
| 2013/0015643 A1 | 1/2013 | Gorman et al. |
| 2013/0076092 A1 | 3/2013 | Kulkarni et al. |
| 2013/0119646 A1 | 5/2013 | Tracht |
| 2013/0119715 A1 | 5/2013 | Medoro et al. |
| 2013/0119723 A1 | 5/2013 | Nitsuma |
| 2013/0119724 A1 | 5/2013 | Adachi et al. |
| 2013/0119741 A1 | 5/2013 | Medoro et al. |
| 2013/0134749 A1 | 5/2013 | Awata et al. |
| 2013/0181492 A1 | 7/2013 | Prescott et al. |
| 2013/0220877 A1 | 8/2013 | Stern |
| 2013/0241255 A1* | 9/2013 | Kulkarni ............... B60N 2/028 297/285 |
| 2013/0285426 A1 | 10/2013 | Rant et al. |
| 2013/0320730 A1 | 12/2013 | Aselage |
| 2013/0320742 A1 | 12/2013 | Murolo et al. |
| 2013/0341975 A1 | 12/2013 | Schneider et al. |
| 2013/0342366 A1 | 12/2013 | Kiefer et al. |
| 2013/0343072 A1 | 12/2013 | Ehrmann et al. |
| 2014/0032043 A1 | 1/2014 | Line et al. |
| 2014/0042781 A1 | 2/2014 | Reeves |
| 2014/0054944 A1 | 2/2014 | Locke et al. |
| 2014/0058305 A1 | 2/2014 | Batterson et al. |
| 2014/0062147 A1 | 3/2014 | Bashir et al. |
| 2014/0070594 A1 | 3/2014 | Awata et al. |
| 2014/0077565 A1 | 3/2014 | Baumgarten et al. |
| 2014/0135991 A1 | 5/2014 | Summer et al. |
| 2014/0139979 A1 | 5/2014 | Blazic |
| 2014/0152057 A1 | 6/2014 | Truant et al. |
| 2014/0167465 A1 | 6/2014 | Sakata et al. |
| 2014/0180181 A1 | 6/2014 | Von Oepen et al. |
| 2014/0203606 A1 | 7/2014 | Line et al. |
| 2014/0203610 A1 | 7/2014 | Line et al. |
| 2014/0203617 A1 | 7/2014 | Line et al. |
| 2014/0265506 A1 | 9/2014 | McMillen et al. |
| 2014/0300145 A1 | 10/2014 | Beroth et al. |
| 2014/0300167 A1 | 10/2014 | Datta |
| 2014/0361571 A1 | 12/2014 | Line et al. |
| 2014/0375100 A1 | 12/2014 | Reese |
| 2015/0108816 A1 | 4/2015 | Dry et al. |
| 2015/0157481 A1 | 6/2015 | Whitaker et al. |
| 2015/0157482 A1 | 6/2015 | Batterson et al. |
| 2015/0165935 A1 | 6/2015 | Sachs et al. |
| 2015/0283970 A1 | 10/2015 | Line et al. |

FOREIGN PATENT DOCUMENTS

| | | |
|---|---|---|
| DE | 3115269 A1 | 10/1982 |
| DE | 3119867 A1 | 12/1982 |
| DE | 3139945 A1 | 4/1983 |
| DE | 3519351 A1 | 12/1986 |
| DE | 3735428 A1 | 5/1989 |
| DE | 3841688 A1 | 6/1990 |
| DE | 4403071 A1 | 8/1994 |
| DE | 3415511 U1 | 11/1994 |
| DE | 19857386 A1 | 6/2000 |
| DE | 10106238 A1 | 9/2002 |
| DE | 10201836 A1 | 8/2003 |
| DE | 10331612 A1 | 2/2005 |
| DE | 102004037069 A1 | 4/2005 |
| DE | 102006061226 A1 | 6/2008 |
| DE | 102010024180 A1 | 2/2011 |
| DE | 102010024544 A1 | 12/2011 |
| DE | 102012006074 A1 | 11/2012 |
| DE | 102012011226 A1 | 12/2012 |
| EP | 3174884 B1 | 9/1987 |
| EP | 3386890 A1 | 9/1990 |
| EP | 3518830 A1 | 12/1992 |
| EP | 3627339 A1 | 12/1994 |
| EP | 3670240 A1 | 9/1995 |
| EP | 0754590 A2 | 1/1997 |
| EP | 3594526 B1 | 9/1997 |
| EP | 3921033 A2 | 6/1999 |
| EP | 1077154 A2 | 2/2001 |
| EP | 0926969 B1 | 1/2002 |
| EP | 1266794 A2 | 12/2002 |
| EP | 1325838 A1 | 7/2003 |
| EP | 1462318 A1 | 9/2004 |
| EP | 1123834 B1 | 10/2004 |
| EP | 1002693 B1 | 9/2005 |
| EP | 1050429 BI | 10/2005 |
| EP | 1084901 B1 | 6/2006 |
| EP | 1674333 A1 | 6/2006 |
| EP | 1674333 BI | 8/2007 |
| EP | 1839932 A2 | 10/2007 |
| EP | 1950085 A3 | 12/2008 |
| EP | 1329356 BI | 11/2009 |
| EP | 2289732 A1 | 3/2011 |
| EP | 2423040 A2 | 2/2012 |
| EP | 2534979 A1 | 12/2012 |
| EP | 2565070 A2 | 3/2013 |
| EP | 2574498 A1 | 4/2013 |
| EP | 2743124 A1 | 6/2014 |
| ES | 2107995 T1 | 12/1997 |
| FR | 2562003 A1 | 10/1985 |
| FR | 2875753 A1 | 3/2006 |
| GB | 1260717 A | 1/1972 |
| GB | 2011254 A | 7/1979 |
| GB | 2403139 A | 12/2004 |
| GB | 2430420 B | 3/2009 |
| JP | 31036029 A | 2/1986 |
| JP | 35115331 A | 5/1993 |
| JP | 2008189176 A | 8/2008 |
| JP | 2009096422 A | 5/2009 |
| JP | 201178557 A | 4/2011 |
| JP | 2011098588 A | 5/2011 |
| JP | 2011251573 A | 12/2011 |
| KR | 20050110301 A | 11/2005 |
| KR | 20080066428 A | 7/2008 |
| KR | 20100019390 A | 2/2010 |
| KR | 1020110051692 A | 5/2011 |
| KR | 101180702 B1 | 9/2012 |
| NO | 3534449 A1 | 12/1995 |
| NO | 3815435 A1 | 4/1998 |
| NO | 3831992 A1 | 7/1998 |
| NO | 3021797 A1 | 4/2000 |

(56) References Cited

FOREIGN PATENT DOCUMENTS

| NO | 3144026 A1 | 6/2001 |
|---|---|---|
| NO | 2010096307 A1 | 8/2010 |
| NO | 2011068684 A1 | 6/2011 |
| NO | 2012138699 A1 | 10/2012 |
| NO | 2013040085 A2 | 3/2013 |
| NO | 2013070905 A1 | 5/2013 |
| NO | 2013101644 A1 | 7/2013 |
| NO | 2014047417 A1 | 3/2014 |
| WO | WO9511818 A1 | 5/1995 |
| WO | WO9958022 A1 | 11/1999 |
| WO | VV02006131189 A1 | 12/2006 |
| WO | 2007009893 A2 | 1/2007 |
| WO | WO2007028015 A2 | 3/2007 |
| WO | 2008019981 A1 | 2/2008 |
| WO | WO2008073285 A1 | 6/2008 |
| WO | WO2011021952 A1 | 2/2011 |
| WO | WO2012008904 A1 | 1/2012 |

OTHER PUBLICATIONS

Thigh Support for Tall Drivers, http://cars.about.com/od/infiniti/ig/2009-Infiniti-G37-Coupe-pics/2008-G37-cpe-thigh-support.htm (1 page) [Accessed from the internet Apr. 10, 2013].
Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).
Erose India Automotive Systems, "Adaptive Sensor Controlled Headrest," http://www.indiamart.com/broseindiaautomotivesystems/products.html, Oct. 9, 2012 (12 pages).
eCOUSTICS.Com, "Cineak Motorized Articulating Headrest Preview," http://www.ecoustics.com/ah/reviews/furniture/ accessories/cineak-motorized-headrest, Oct. 9, 2012 (3 pages).
"Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.
Frankfurt 2009 Trend—Light and Layered. by Hannah Macmurray, Published in GreenCarDesign, (http://www.greencardesign.com/site/trends/00138-frankfurt-2009-trend-light-and-layered), Sep. 2009, 9 pages.
'Imola Pro-fir, Cobra, (http://cobra.subesports.com/products/cat/seats/brand/Cobra/prodID/656), Date unknown, 2 pp.
Freedman Seating Company, "Go Seat," http://www.freedmanseating.com/images/uploads/files/ GOSeat_Brochure_10-19.pdf, (date unknown), 2 pgs.
Metro Magazine, "Vehicle Seating Manufacturers Offer Flexible Dseign Options, Enhanced Construction," http://www.metro-magazine.com/article/prinl/2012/01/vehicle-seating-manufacturers-offer-flexible-design-options-enahnced-construction.aspx, Jan. 2012, 3 pgs.
Seat Comfort Systems, Installation Manual, KIT P/N: SCSOOOOOC3, http://www.techwebasto.com/accessories_main/seat_accessories/g_scs_vent_install.pdf, (date unknown), 7 pgs.
Reviews, "Audi A4 Saloon RS4", http://www.theaa.com/allaboutcars/cartestreports/2006037.html, Apr. 2006, 5 pgs.
Recaro Gmbh & Co. Kg, "Seat Range", Id no. 7218054, Mar. 2010, 21 pgs.
Kelley Blue Book, "2011 Mercedes-Benz Cl-Class", http://www.kbb.com/mercedes-benz/cl-class/2011- mercedes-benz-cl-class/, Feb. 28, 2013, 5 pgs.
Lexus, "The all-new Lexus 2013", lexus.com P2-332, Feb. 2012, 13 pgs.
Mercedes-Benz, "Interior comfort—spoilt for choice", http://www.zungfu.com/pc_E_saloon.comfort.1.shtml, Feb. 28, 2013, 3 pgs.
Rostra Precision Controls Inc., "Universal Lumbar Installation Instructions", http://www.rostra.com/manuals/ form3132F.pdf, Nov. 2, 2007, 8 pgs.
Seats, http://www.bavarianmw.com/guide-4400.html,www.bmwmanuals.org, 2012, 5 pgs.
Mercedes-Benz, "Seat belts and airbags", http://www.mbusa.com/vcm/Mb/DigitalAssets/pdfmb/serviceandparts/ seatbelts_airbags.pdf, Oct. 27, 2005, 11 pgs.
Sae International, "Capacitive Sensors Increase Safety, Comfort", http://sae.org/automag/ technewsletter/071106Electronics/04.htm, Jun. 13, 2013, 3 pp.
General Motors Llc, "2013 Chevrolet Spark Owner Manual;" copyright 2012, 356 pp.
Matthew W Ing, United States Patent and Trademark Office, Non Final Office Communication re Application No. 13/749,561, Oct. 16, 2015, 33 pp.
Richard a Lowry, United States Patent and Trademark Office, Non Final Office Communication re Application No. 13/748,847, Sep. 10, 2014, 14 pp.
David E Allred, United States Patent and Trademark Office, Non Final Office Communication re Application No. 13/748,857, Aug. 25, 2014, 13 pp.
Timothy J Brindley, United States Patent and Trademark Office, Final Office Communication re Application No. 13/749,568, Mar. 26, 2015, 9 pp.
Timothy J Brindley, United States Patent and Trademark Office, Non Final Office Communication re Application No. 13/749,568, Sep. 8, 2014, 9 pp.
Milton Nelson Jr., United States Patent and Trademark Office, Final Office Communication re Application No. 13/749,572, Mar. 3, 2015, 13 pp.
Milton Nelson Jr., United States Patent and Trademark Office, Non Final Office Communication re Application lo. 13/749,572, Sep. 30, 2014, 20 pp.
Iicole T Verley, United States Patent and Trademark Office, Non Final Office Communication re Application No. 13/749,589, Oct. 4, 2013, 12 pp.
Timothy J Brindley, United States Patent and Trademark Office, Non Final Office Communication re Application lo. 13/749,595, Aug. 28, 2014, 10 pp.
Timothy J Brindley, United States Patent and Trademark Office, Final Office Communication re Application No. 13/749,595, Jan. 12, 2015, 10 pp.
Timothy J Brindley, United States Patent and Trademark Office, Non Final Office Communication re Application lo. 13/749,584, Sep. 15, 2014, 9 pp.
Yolanda G Giacoman, United States Patent and Trademark Office, Final Office Communication re Application No. 13/748,862, Dec. 30, 2015, 10 pp.
Yolanda G Giacoman, United States Patent and Trademark Office, Non Final Office Communication re Application lo. 13/748,862, Aug. 13, 2015, 9 pp.
Yolanda G Giacoman, United States Patent and Trademark Office, Final Office Communication re Application No. 13/748,862, Mar. 10, 2015, 19 pp.
Yolanda G Giacoman, United States Patent and Trademark Office, Non Final Office Communication re Application lo. 13/748,862, Sep. 25, 2014, 16 pp.
Milton Nelson Jr., United States Patent and Trademark Office, Non Final Office Communication re Application lo. 13/749,602, Sep. 19, 2014, 9 pp.
Melissa Ann Black, United States Patent and Trademark Office, Non Final Office Communication re Application No. 13/914,666, Mar. 13, 2015, 6 pp.
Philip F Gabler, United States Patent and Trademark Office, Non Final Office Communication re Application No. 14/025,483, Dec. 17, 2014, 8 pp.
Philip F Gabler, United States Patent and Trademark Office, Final Office Communication re Application No. 14/025,483, Apr. 23, 2015, 10 pp.
Philip F Gabler, United States Patent and Trademark Office, Non Final Office Communication re Application No. 14/025,483, Aug. 18, 2015, 14 pp.
Philip F Gabler, United States Patent and Trademark Office, Final Office Communication re Application No. 14/025,483, Dec. 18, 2015, 14 pp.

(56) References Cited

OTHER PUBLICATIONS

Peter R Brown, United States Patent and Trademark Office, Final Office Communication re Application No. 14/104,780, Dec. 1, 2015, 5 pp.
Peter R Brown, United States Patent and Trademark Office, Non Final Office Communication re Application No. 14/104,780, Jun. 29, 2015, 9 pp.
Nicole T Verley, United States Patent and Trademark Office, Advisory Action for Application No. 14/056,005, Sep. 30, 2015, 3 pp.
Nicole T Verley, United States Patent and Trademark Office, Final Office Communication re Application No. 14/056,005, Jun. 10, 2015, 8 pp.
Nicole T Verley, United States Patent and Trademark Office, Non Final Office Communication re Application No. 14/056,005, Mar. 2, 2015, 8 pp.
Peter R Brown, United States Patent and Trademark Office, Non Final Office Communication re Application No. 14/056,000, Mar. 4, 2015, 7 pp.
Peter R Brown, United States Patent and Trademark Office, Non Final Office Communication re Application No. 14/056,000, Oct. 1, 2014, 8 pp.
Philip F Gabler, United States Patent and Trademark Office, Final Office Communication re Application No. 14/076,893, Sep. 29, 2015, 13 pp.
Philip F Gabler, United States Patent and Trademark Office, Non Final Office Communication re Application No. 14/076,893, Apr. 21, 2015, 12 pp.
David E Allred, United States Patent and Trademark Office, Non Final Office Communication re Application No. 14/063,647, Aug. 18, 2015, 19 pp.
Matthew W Ing, United States Patent and Trademark Office, Non Final Office Communication re Application No. 14/609,092, Oct. 19, 2015, 11 pp.
Alexander Scott Harrison, United States Patent and Trademark Office, Final Office Communication re Application No. 14/243,027, Jan. 20, 2016, 17 pp.
Alexander Scott Harrison, United States Patent and Trademark Office, Non Final Office Communication re Application No. 14/243,027, Aug. 13, 2015, 15 pp.
Ryan D Kwiecinski, United States Patent and Trademark Office, Non Final Office Communication re Application No. 14/230,961, Dec. 24, 2015, 12 pp.
Philip F Gabler, United States Patent and Trademark Office, Final Office Communication re Application No. 14/257,655, Dec. 18, 2015, 10 pp.
Philip F Gabler, United States Patent and Trademark Office, Non Final Office Communication re Application No. 14/257,655, Aug. 20, 2015, 10 pp.
Syed a Islam, United States Patent and Trademark Office, Final Office Communication re Application No. 14/275,368, Nov. 13, 2015, 13 pp.
Syed a Islam, United States Patent and Trademark Office, Non Final Office Communication re Application No. 14/275,368, May 6, 2015, 10 pp.
Laurie K Cranmer, United States Patent and Trademark Office, Non Final Office Communication re Application No. 14/505,675, Aug. 31, 2015, 7 pp.
Rodney Barnett White, United States Patent and Trademark Office, Non Final Office Communication re Application No. 14/600,166, Nov. 2, 2015, 7 pp.
Rodney Barnett White, United States Patent and Trademark Office, Final Office Communication re Application No. 14/534,296, Dec. 11, 2105, 14 pp.
Rodney Barnett White, United States Patent and Trademark Office, Non Final Office Communication re Application No. 14/534,296, Aug. 26, 2015, 13 pp.
Sanjeev Malhotra, United States Patent and Trademark Office, Non Final Office Communication re Application No. 14/534,285, Sep. 23, 2015, 14 pp.
Nicole T Verley, United States Patent and Trademark Office, Non Final Office Communication re Application No. 14/635,025, Dec. 4, 2015, 8 pp.

* cited by examiner

US 9,849,817 B2

COMPOSITE SEAT STRUCTURE

FIELD OF THE DISCLOSURE

The present disclosure generally relates to a vehicle seating assembly, and more particularly to the seat structure for a vehicle seat.

BACKGROUND OF THE DISCLOSURE

Modern vehicle seats are becoming more and more comfortable as a further understanding of human ergonomics, posture, and comfortability is studied. Vehicle seating assemblies that include comfort components in the vehicle seatback and the vehicle seat can provide the driver and passengers with improved comfort and increased endurance for extensive vehicle rides. Additionally, safety concerns for passengers during collision events are considered in vehicle seat design. Accordingly, vehicle seating assemblies that include components to accommodate the different sizes and shapes of drivers and passengers, as well as maintain safety of drivers and passengers, have become increasingly important.

SUMMARY OF THE DISCLOSURE

According to one aspect of the present disclosure, a vehicle seating assembly is provided that includes a seatback and a seat base operably connected to the seatback. The seat base includes a seat base frame having a rear tube extending laterally between at least two side members, a seat cushion assembly, and a composite seat pan positioned between the seat cushion assembly and the seat base frame and having a plurality of recessed features configured to couple over the rear tube and side members. The seat pan integrally defines a flexible cross bar extending laterally between the recessed features. A plurality of hooks integrally defined by the seat pan are operably coupled to the seat cushion assembly.

According to another aspect of the present disclosure, a vehicle seat base is provided that includes a seat base frame having at least two side members, a seat cushion assembly, and a seat pan positioned between and operably coupled to both the seat base frame and the seat cushion assembly. The seat pan integrally defines a cross bar extending between the two side members. The cross bar is configured to flex laterally and vertically.

According to yet another aspect of the present disclosure, a vehicle seat base is provided that includes a seat base frame having a rear tube extending laterally across the frame between two side members and a seat pan defining a plurality of recessed features configured to operably couple with the rear tube and the side members such that the seat frame is at least partially nested within the seat pan.

These and other aspects, objects, and features of the present disclosure will be understood and appreciated by those skilled in the art upon studying the following specification, claims, and appended drawings.

DETAILED DESCRIPTION OF THE EMBODIMENTS

Figures 1, 2:
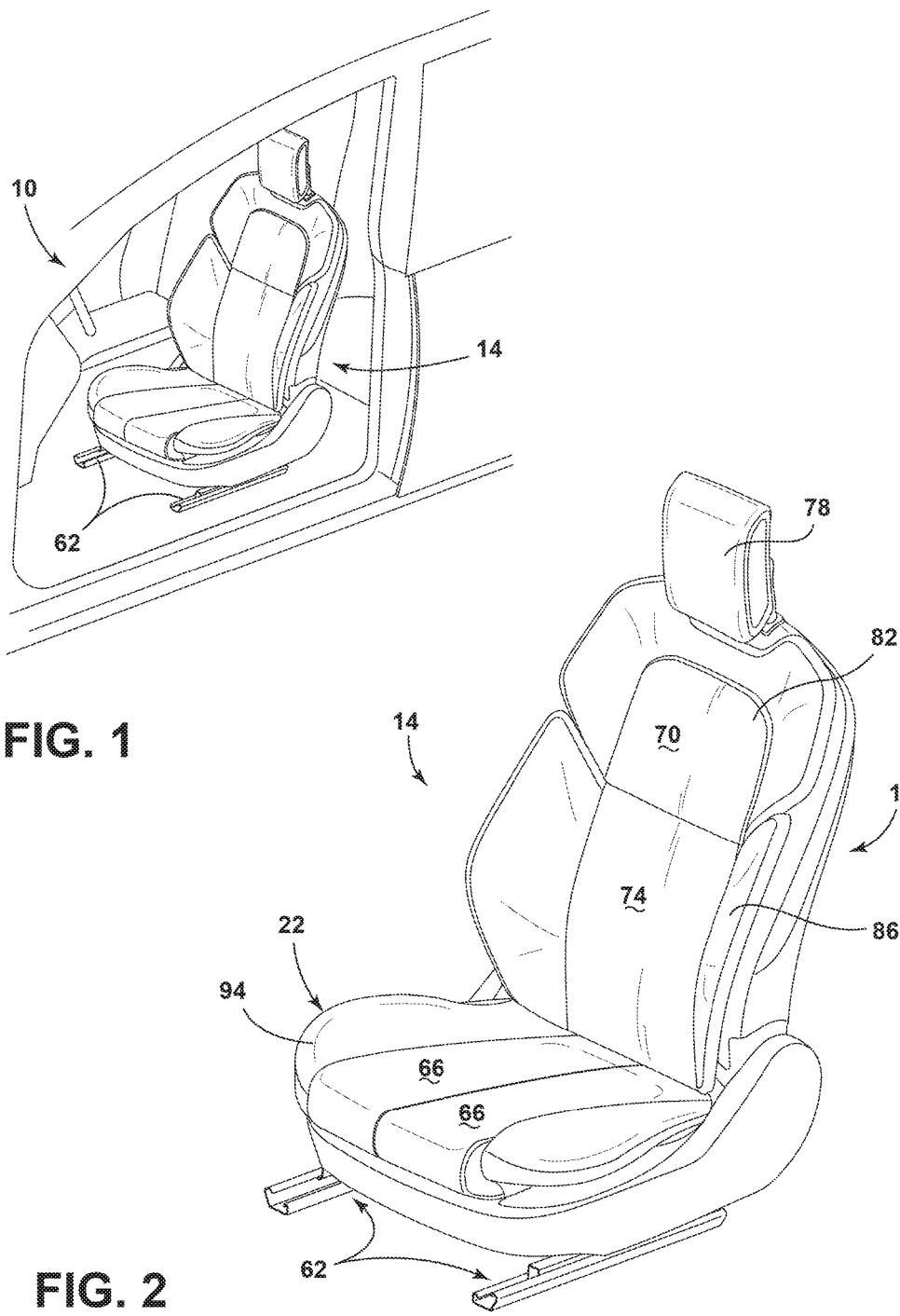
FIG. 1 is a top perspective view of a vehicle seating assembly of the present disclosure disposed in a vehicle.
FIG. 2 is an enlarged top perspective view of the vehicle seating assembly of FIG. 1.

Reference will now be made in detail to the present embodiments, examples of which are illustrated in the accompanying drawings. Whenever possible, the same reference numerals will be used throughout the drawings to refer to the same or like parts.

For purposes of description herein, the terms "upper," "lower," "right," "left," "rear," "front," "vertical," "horizontal," and derivatives thereof, shall relate to the disclosure as oriented in FIG. 1, unless stated otherwise. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise. Additionally, embodiments depicted in the figures may not be to scale or may incorporate features of more than one embodiment.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to the examples illustrated in FIGS. 1-5, reference numeral 10 generally designates a vehicle which includes a seating assembly 14. The seating assembly 14 includes a seatback 18 and a seat base 22 operably connected to the seatback 18. The seat base 22 includes a seat base frame 26 having a rear tube 30 extending laterally between at least two side members 34. The seat base 22 further includes a seat cushion assembly 38 and a seat pan 42. The seat pan 42 is positioned between the seat cushion assembly 38 and the seat base frame 26. The seat pan 42 has a plurality of recessed features 46 configured to couple over the rear tube 30 and side members 34. The seat pan 42 integrally defines a flexible cross bar 50 extending laterally between the recessed features 46. A plurality of hooks 54 may be integrally defined by the seat pan 42 and may operably couple the seat pan 42 to the seat cushion assembly 38.

Figure 3:
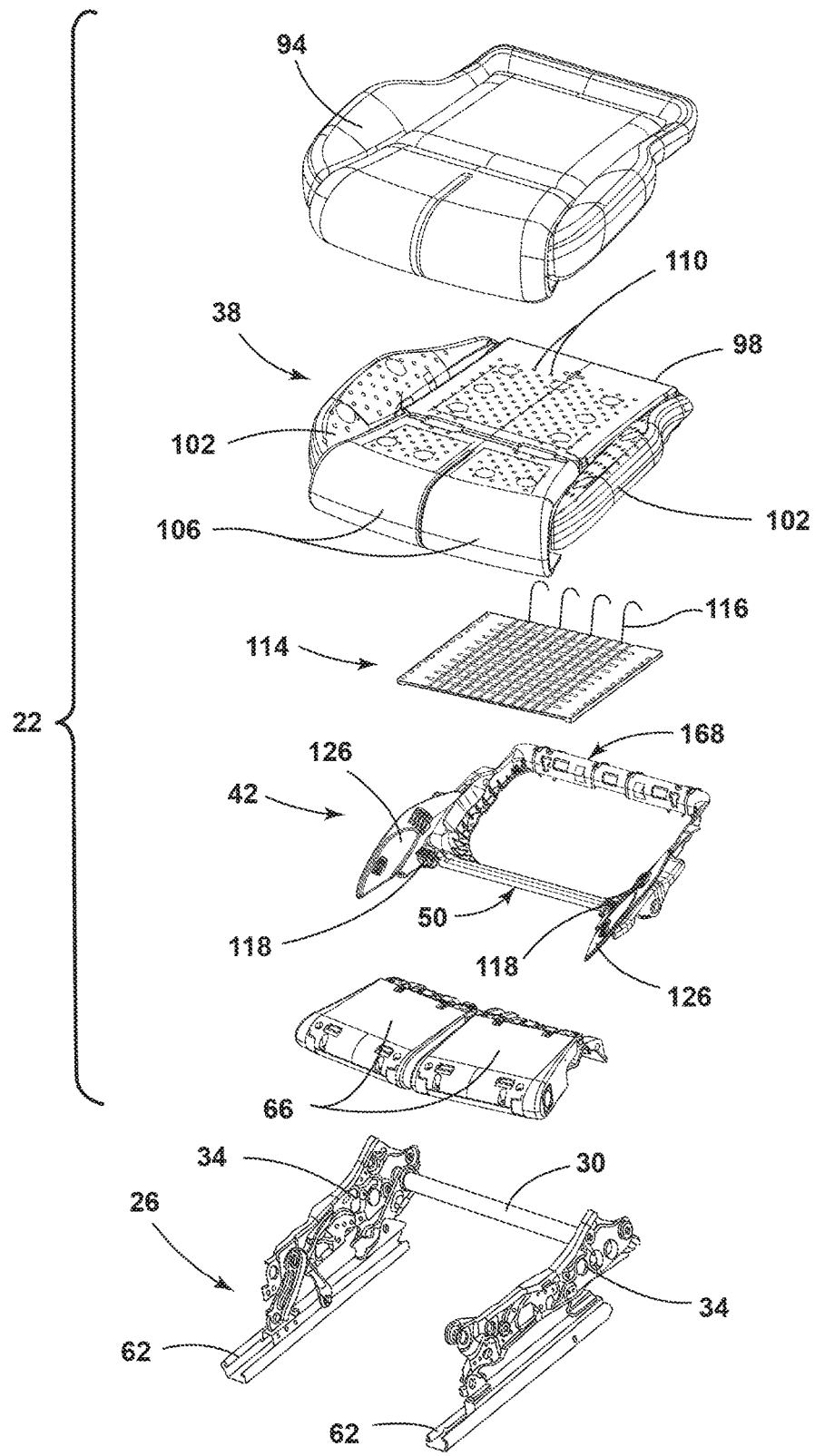
FIG. 3 is a top perspective partial exploded view of a seat of the vehicle seating assembly of the present disclosure.

Referring now to FIGS. 1-3, the illustrated vehicle seating assembly 14 is configured for use in a vehicle of any type, including, without limitation, cars, vans, trucks, buses, etc. The vehicle seating assembly 14 is suspended on rails 62 that allow movement of the vehicle seating assembly 14 in fore and aft directions within the vehicle 10. In addition, the vehicle seating assembly 14 may include a variety of comfort controls, including, for example, thigh support using independent thigh supports 66, lumbar support, and upper thoracic support. The seatback 18 includes both an upper seatback 70 and a lower seatback 74. The vehicle seating assembly 14 includes a head restraint 78 that is disposed on the upper seatback 70. The head restraint 78 is moveable between forward and rearward positions to accommodate various sized heads of passengers, as well as different heights of passengers. The vehicle seating assembly 14 also includes controls specifically configured to adjust an upper thoracic portion 82 of the upper seatback 70 or a lower thoracic portion 86 of the lower seatback 74.

The seat base 22 includes the seat pan 42 that is operably coupled with the seat base frame 26, and which is configured to support the seat cushion assembly 38 and a cover stock 94 disposed thereon. The seat pan 42 is positioned between the seat base frame 26 and the seat cushion assembly 38. A climate control system may be provided, which can draw air from, or blow air through, the seat cushion assembly 38 and cover stock 94. The seat cushion assembly 38 includes a main cushion 98, seat side bolsters 102 and forward thigh support cushions 106. The thigh support cushions 106 are configured to wrap over the thigh supports 66 to provide comfort while supporting the passenger's thighs. The main cushion 98 and/or side bolsters 102 may include a plurality of ventilation holes 110 configured to allow air to pass through the seat base 22. Disposed between the seat pan 42 and the seat cushion assembly 38 is a suspension member 114 configured to provide support to a passenger in the seating assembly 14. The suspension member 114 includes a plurality of suspension hooks 116 positioned at a rear of the suspension member 114.

With further reference to FIG. 3, the vehicle seating assembly 14 includes the seat base 22. The seatback 18 (FIG. 2) is operably coupled to a rear of the seat base 22. Each of the first and second independently moveable thigh supports 66 are independently laterally translatable forward and rearward relative to the seat base 22. A spring assembly may be used to urge each thigh support 66 to a fully forward lateral position. Each of the first and second independently moveable thigh supports 66 are rotatable relative to the seat base 22. The thigh supports 66 may be coupled to the seat pan 42 at thigh attachment points 118 positioned on a vehicle forward location of the seat pan 42. The thigh attachment points 118 may be integrally defined by the seat pan 42 or may be coupled thereto. As noted above, the thigh supports 66 are configured to rotate upward and downward relative to the seat base 22 between raised and lowered positions, and are also configured to translate laterally between extended and retracted positions relative to the seat base 22. The moveable thigh supports 66 are independent such that one thigh support 66 may be at the raised position, while the other thigh support 66 may be at the lowered position, or at any position in between the raised and lowered positions.

Figure 4A:
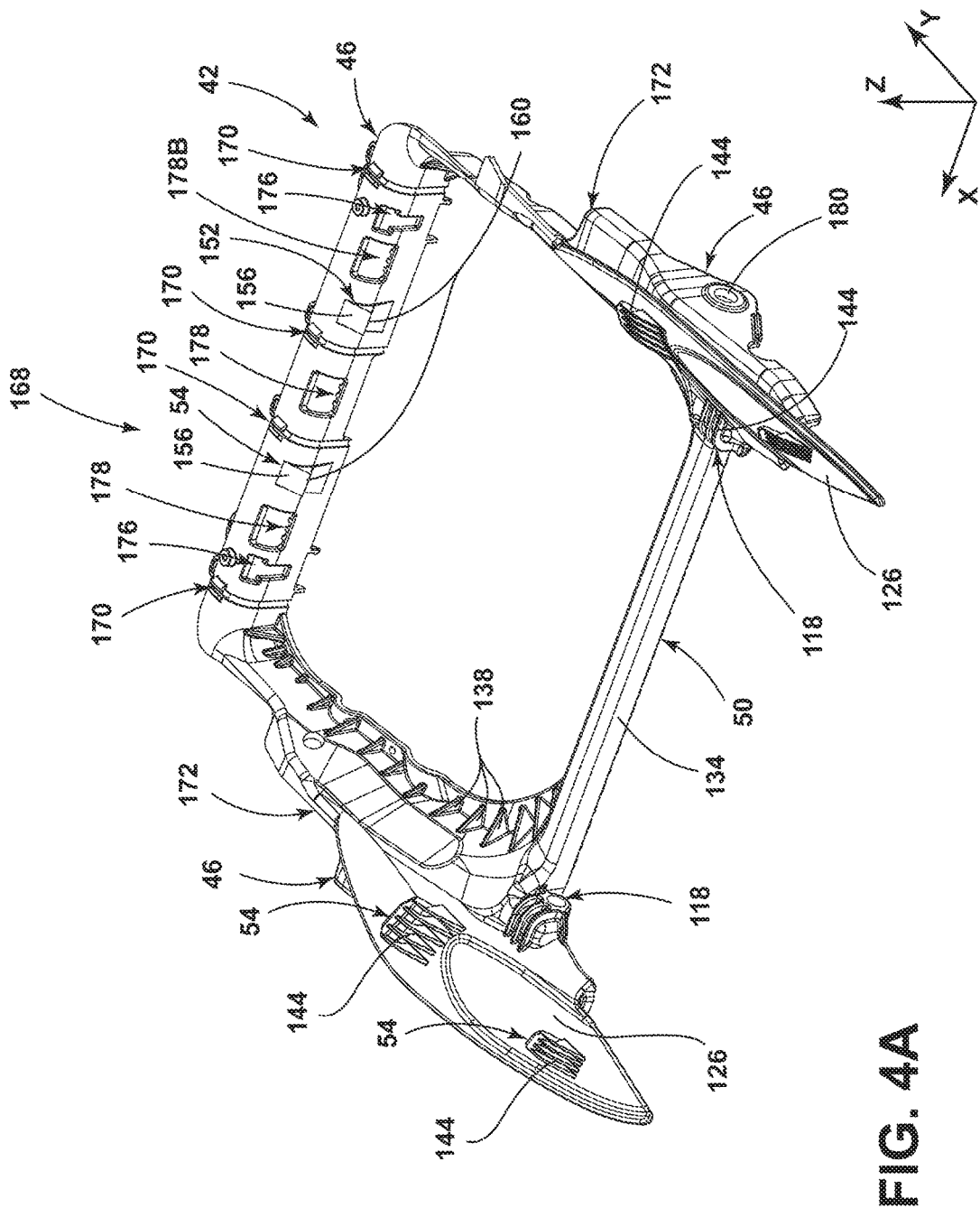
FIG. 4A is a top perspective view of a seat pan of the present disclosure.
Figure 4B:
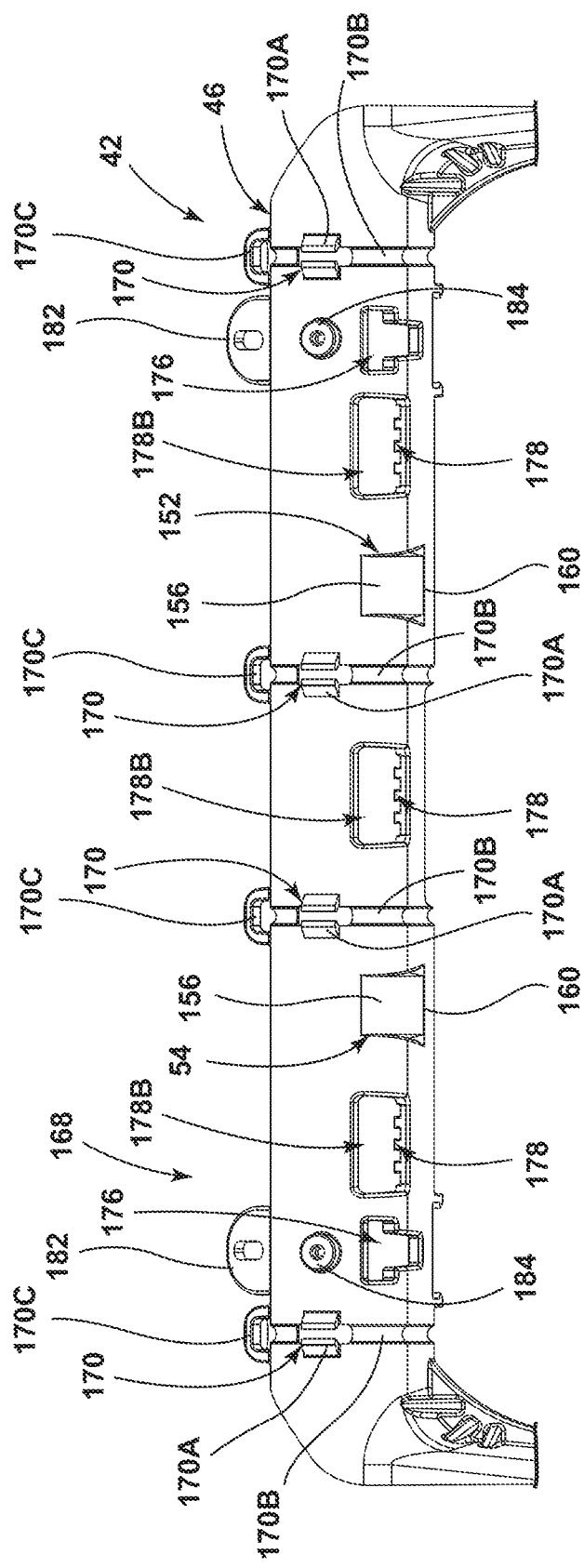
FIG. 4B is an enhanced top view of the seat pan of the present disclosure.
Figure 4C:
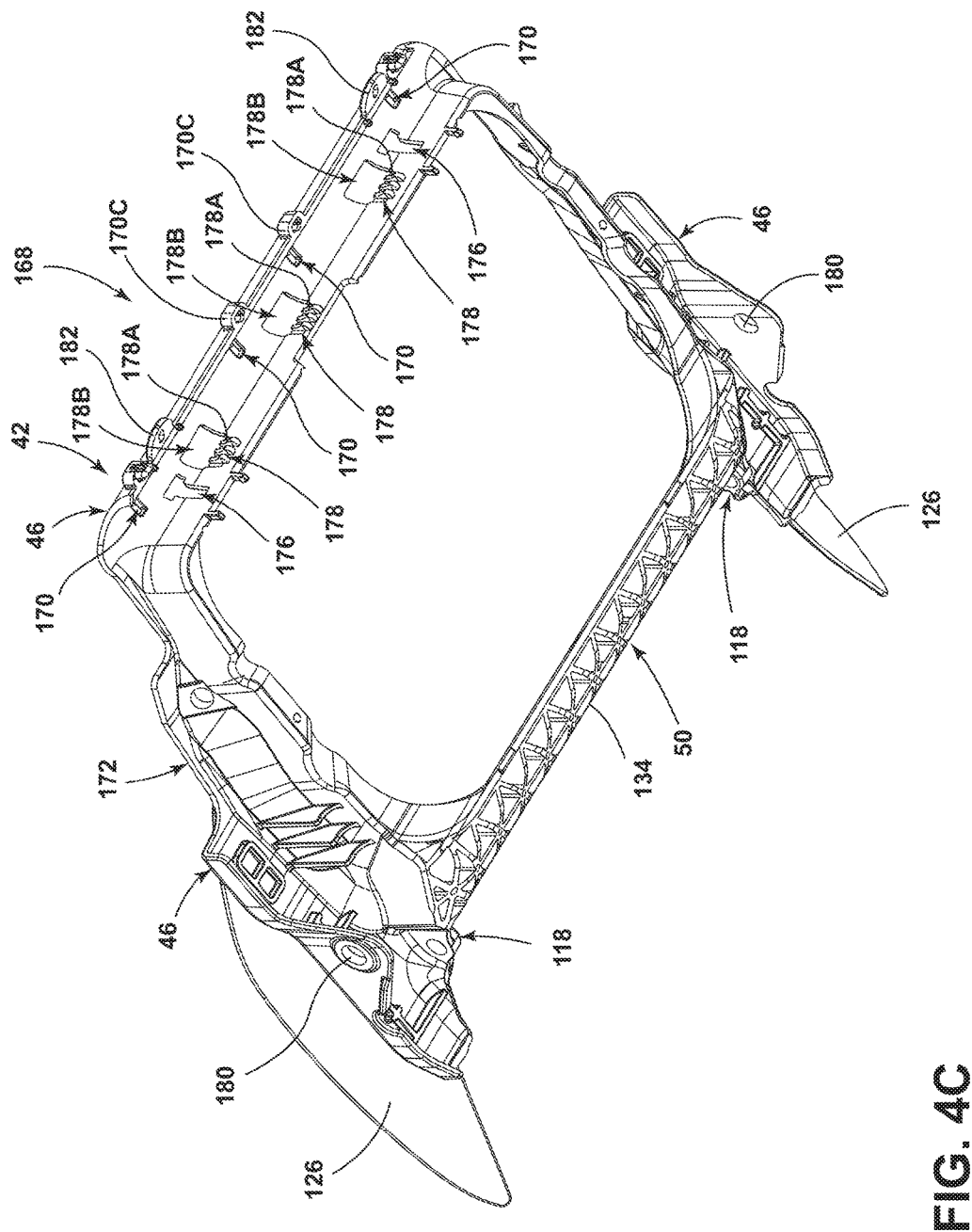
FIG. 4C is a bottom perspective view of the seat pan of the present disclosure.
Figure 5:
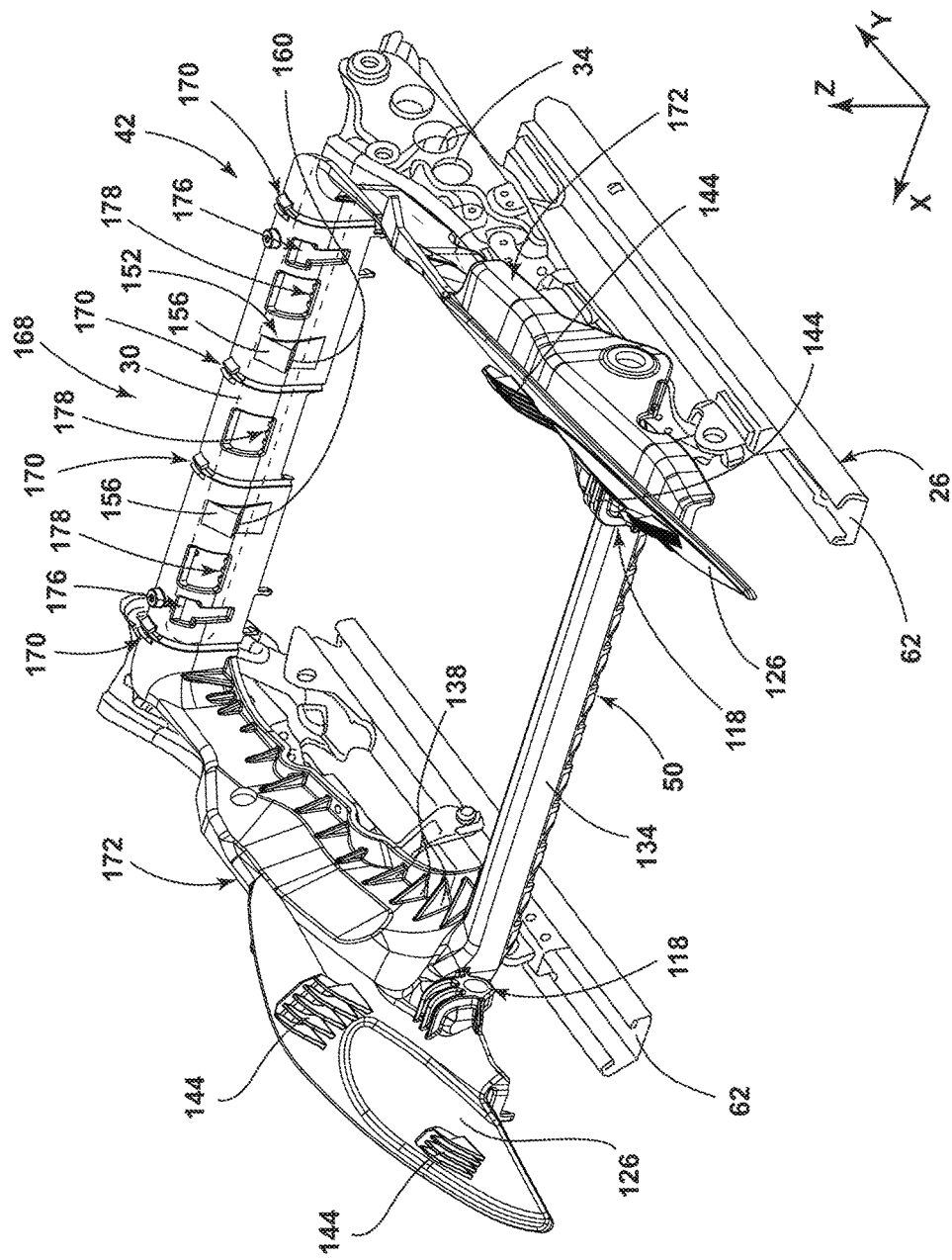
FIG. 5 is a top perspective view of the seat pan of FIG. 4A coupled with a seat frame of the present disclosure.

Referring now to FIG. 4A, the seat pan 42 may be formed of a metal, plastic, or composite material. In composite material examples of the seat pan 42, the seat pan 42 may be formed of a fiber filler and resin combination. The fiber filler volume fraction within the resin may be between about 1% and about 60%, or between about 15% and about 40%, or between about 30% and about 40%. In a specific example, the fiber filler volume fraction within the seat pan 42 may be about 35%. The fibers may be composed of materials including carbons, aramids, aluminum metals, aluminum oxides, steels, borons, silicas, silicon carbides, silicon nitrides, ultra-high-molecular-weight polyethylenes, A-glasses, E-glasses, E-CR-glasses, C-glasses, D-glasses, R-glasses, and S-glasses. The fibers may be continuous or chopped to a particular length. The length of the chopped fibers can be between about 1 mm and about 20 mm, or between about 3 mm and about 11 mm, or between about 5 mm and about 7 mm. Typically, the fibers are randomly oriented in the resins within the seat pan 42. However, the fibers may also be substantially aligned directionally in areas of the seat pan 42 subject to high directional stresses or areas of anticipated stress (e.g., connections or transitions between parts of the seat pan 42). The seat pan 42 may incorporate one or more preformed fiber mats which may include woven or non-woven fibers that are held together using the same or different resins as employed in the seat pan 42. The resin employed in the seat pan 42 may include a nylon, a polypropylene, an epoxy, a polyester, a vinyl ester, a polyetheretherketone, a poly(phenylene sulfide), a polyetherimide, a polycarbonate, a silicone, a polyimide, a poly(ether sulfone), a melamine-formaldehyde, a phenol-formaldehyde, and a polybenzimidazole, or combinations thereof. The use of a composite material such as a fiber filled resin may allow the seat pan 42 to be formed via injection molding, thermoforming, and other processes for forming a polymeric member. The use of a fiber composite material for the seat pan 42 may allow for increased durability and fatigue loading of the seat pan 42.

In the depicted example, the seat pan 42 includes side bolsters 126. The side bolsters 126 may be integrally formed with the seat pan 42 or may be attached thereto. The side bolsters 126 are configured to support and flex under stress to provide resiliency to the seat side bolsters 102 (FIG. 3). Additionally, integrally forming the side bolsters 126 with the seat pan 42 increases the structural support for the passenger during ingress/egress from the seating assembly 14, as well as during jounce and abuse loading circumstances. The side bolsters 126 are configured to deflect or flex in an X-direction, a Y-direction, and/or a Z-direction. The side bolsters 126 may deflect greater than about 10 mm, 20 mm, 30 mm, 40 mm, 50 mm, 60 mm, 70 mm, 80 mm, 90 mm, or greater than about 100 mm in any or all of the X-, Y-, or Z-directions without breaking or breakage during a stress or loading event (e.g., front end collision of the vehicle 10 or movement of a passenger within the seating assembly 14 of FIG. 1). Extending across the seat pan 42 and between the recessed features 46 is the cross bar 50. The cross bar 50 may include a wall 134 and a plurality of ribs 138. The plurality of ribs 138 extend in a direction perpendicular to that of the wall 134. The positioning of the ribs 138 along the wall 134 provides a stress relief design for the cross bar 50 such that it may flex or deflect. The cross bar 50 may take a variety of cross-sectional shapes including square, rectangular, circular, ellipsoid, or other shapes configured to define the wall 134. The cross bar 50 is configured to deflect or flex in the X-direction, the Y-direction, and the Z-direction. The cross bar 50 may deflect greater than about 10 mm, 20 mm, 30 mm, 40 mm, 50 mm, 60 mm, 70 mm, 80 mm, 90 mm, or greater than about 100 mm, in any or all of the X-, Y-, or Z-directions without breaking or breakage during a stress or loading event (e.g., a front end collision) under temperature conditions as high as 70° C. and humidity as high as 60%. In some examples, the temperature and/or humidity of the environment surrounding the seat pan 42 may affect (e.g., increase) the deflection amount of the cross bar 50. By configuring the cross bar 50 to be flexible, it allows the cross bar 50 to deflect during an impact or sudden deceleration event for the vehicle 10. During forward impact or sudden deceleration of the vehicle 10, a passenger of the seating assembly 14 may be forced into the seat base 22 (FIG. 1) due to continued forward motion of the passenger relative to the seating assembly 14. Movement of the passenger into the seat base 22 may cause submarining, or movement of the passenger below a safety belt of the seating assembly, to occur. By configuring the cross bar 50 to flex and deflect under stress, but not break, a passenger of the seating assembly 14 may be decelerated safely such that submarining is minimized or eliminated.

As explained above, the seat pan 42 defines a plurality of hooks 54 disposed about the seat pan 42. In the depicted example, each of the side bolsters 126 integrally define a pair of rearward hooks 144. In other examples, the rearward hooks 144 may be otherwise joined to the side bolsters 126. The rearward hooks 144 are configured to face in a vehicle rearward direction and are configured to engage the seat cushion assembly 38 of FIG. 3 and retain it against the seat pan 42. The seat cushion assembly 38 may define a plurality of recesses or retention features on an underside of the main cushion 98 and seat side bolsters 102 configured to engage and retain the rearward hooks 144. Additionally, the rearward facing nature of the rearward hooks 144 resists the motion of the seat cushion assembly 38 in a vehicle forward direction during an impact or sudden deceleration event. In some examples, the rearward hooks 144 may include a snap feature such that the seat cushion assembly 38 is locked to the seat pan 42. In addition to the rearward hooks 144, the plurality of hooks 54 also include at least one downward hook 152. In the depicted example, the seat pan 42 integrally defines two downward hooks 152. The downward hooks 152 include an angled surface 156 and a retention lip 160. The downward hooks 152 are configured to retain the seat cushions assembly 38 downward against the seat pan 42. During an exemplary assembly method of the seat cushion assembly 38 to the seat pan 42, the seat cushion assembly 38 is engaged (e.g., snapped) to the rearward hooks 144 by applying vehicle forward motion to the seat cushion assembly 38. Once the seat cushion assembly 38 is attached to the rearward hooks 144, the rear of the seat cushion assembly 38 is forced downward under the downward hooks 152. During the downward motion of the seat cushion assembly 38, the seat cushion assembly 38 contacts and slides along the angled surface 156. The seat cushion assembly 38 is then slid under the retention lip 160. The retention lip 160 extends over the seat cushion assembly 38 such that the seat cushion assembly 38 is rotationally and vertically locked under the downward hooks 152.

Referring now to FIGS. 4A-4C and 5, in addition to the plurality of hooks 54 and the cross bar 50, the seat pan 42 additionally defines the plurality of recessed features 46. The plurality of recessed features 46 include a rear recessed feature 168 and side recessed features 172. The rear recessed feature 168 extends the width of the seat pan 42 and has a generally curved structure. The curved structure of the rear recessed feature 168 is configured to couple with the rear tube 30 of the seat base frame 26. The rear recessed feature 168 is configured to partially surround, or nest, over the rear tube 30 such that the rear tube 30 supports the seat pan 42 through the rear recessed feature 168. The rear tube 30 may be any lateral cross member that is hollow or solid, and may take a variety of cross-sectional shapes including rectangular, square, circular, ellipsoid or others configured to provide structural rigidity to the seat base frame 26. In examples where the rear tube 30 is a shape other than circular, the rear recessed feature 168 may be complimentarily shaped to couple or nest over the rear tube 30. As depicted, the downward hooks 152 are defined on the rear recessed feature 168. Additionally, the rear recessed feature 168 may define one or more attachment apertures 176 which may be utilized with a fastener for securing the rear recessed feature 168 to the rear tube 30. The rear recessed feature 168 defines a plurality of locking features 178. The locking features 178, in the depicted example, include a plurality of teeth. The locking features 178 protrude into the recessed portion of the rear recessed feature 168 and are configured to engage the rear tube 30 (FIG. 3). The locking features 178 define upwardly curved surfaces 178A configured to mate with the rear tube 30. The upwardly curved surfaces 178A extend partially under the rear tube 30, such that the rear tube 30 may be snap fit into the rear recessed feature 168 and the seat pan 42 is secured to the seat base frame 26. Additionally or alternatively, the locking features 178 may be used to help locate the seat pan 42 onto the correct location on the rear tube 30. Further, the rear recessed feature 168 defines a plurality of locking apertures 178B which may allow one or more fasteners to fasten the seat pan 42 to the rear tube 30. In another example, a portion of the rear tube 30 may extend through the locking apertures 178B.

Further, the rear recessed feature 168 may define one or more suspension attachment features 170. The suspension attachment features 170 include a suspension clip 170A, a suspension channel 170B, and a suspension retainer 170C. The suspension attachment features 170 are configured to engage the suspension hooks 116. The suspension clips 170A may be snap features, clips, hook and loop attachments or other features configured to grip the suspension hooks 116 to provide retention between the suspension member 114 and the seat pan 42. The suspension channels 170B are sized to accept the suspension hooks 116 to create a low profile appearance. The suspension hooks 116 wrap over the rear recessed feature 168 through the suspension channel 170B and suspension clips 170A, and engage the suspension retainers 170C. The suspension retainers 170C retain the ends of the suspension hooks 116 in place. Positioned proximate the suspension retainers 170C are retaining flanges 182. The retaining flanges 182 are configured to accept a fastener to further secure the seat pan 42 to the seat base frame 26 or other seating relating structures. Positioned on top of the rear recessed feature 168 may be a plurality of fasteners 184.

The side recessed features 172 are positioned proximate the side bolsters 126 along sides of the seat pan 42. The side recessed features 172 are shaped complimentary to that of the side members 34 and have sufficient width such that the side recessed features 172 may couple over, or nest on, the side members 34. The side recessed features 172 may define attachment points 180 through which a bolt or other fastener may be used to secure the seat pan 42 to the side members 34 of the seat base frame 26. Cooperation of the bolts or fasteners through the attachment points 180 and the attachment apertures 176 aid in securing the seat pan 42 to the seat frame 26.

Use of the recessed features 46 may allow for easy assembly of the seat pan 42 to the seat frame 26. In an exemplary assembly method, the seat pan 42 is positioned over the seat frame 26 such that the recessed features 46 are aligned with the side members 34 and the rear tube 30. The seat pan 42 is then placed on the seat frame 26 such that the recessed features 46 are nested on the side members 34 and the rear tube 30. Finally, fasteners may be secured through the attachment points 180 and the attachment apertures 176 to secure the seat pan 42 to the seat frame 26.

Use of the present disclosure may offer several advantages. For example, use of the present disclosure may allow the seating assembly 14 to meet various testing standards including static strength, dynamic strength, vibration and durability/fatigue, dynamic pulses, safety crashes, passenger jounce as well as ingress/egress, squeak/rattle, abuse loading, thigh support, life cycle and others. Additionally, use of the present disclosure may increase the modularity of the seating assembly 14 which may decrease costs associated with shipping, overhead, and assembly while correspondingly increasing the customization of the seating assembly 14. Further, the present disclosure may offer a weight neutral or weight savings alternative as compared to traditional seating assemblies while increasing structural performance. Finally, use of the composite seat pan 42 structure allows for the integral molding of connection and attachment points for electrical, mechanical and/or pneumatic systems which may save on assembly time, cost, packaging space, and weight, as well as manufacturing cost.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seat base comprising:
    a seat base frame having two side members and a rear tube;
    a seat cushion assembly; and
    a seat pan coupled to the seat cushion assembly, the seat pan comprising a one-piece frame element comprising two opposing side elements, a pair of side bolsters extending upwardly and outwardly from the side elements, a front cross bar and a rear cross bar, wherein the side elements and the rear cross bar define recesses opening downward on an underside and configured to receive the side members and rear tube, respectively; and
    wherein the seat pan comprises a suspension member having hooks extending over a top of the rear cross bar to support the suspension member in the seat pan.

2. The vehicle seat base of claim 1, wherein the front cross bar is positioned at a vehicle forward location on the seat pan.

3. The vehicle seat base of claim 1, wherein the front cross bar is configured to deflect greater than about 30 mm in a vertical direction before breakage.

4. The vehicle seat base of claim 3, wherein the front cross bar is configured to deflect greater than about 50 mm in a vertical direction before breakage.

5. The vehicle seat base of claim 1, wherein the front cross bar comprises a plurality of ribs spaced along the cross bar.

6. The vehicle seat base of claim 1, wherein the seat pan integrally defines a plurality of hooks configured to attach the seat cushion to the seat pan.

7. The vehicle seat base of claim 1, wherein a portion of the hooks are vehicle rear facing.

8. A vehicle seat base comprising:
    a seat base frame having a rear tube extending between two side members;
    a seat pan comprising a one-piece frame element having two side elements and a cross bar extending between the two side elements, the cross bar and the two side elements respectively having recessed features into which the rear tube and the side members nest, wherein the seat pan comprises two side bolsters that extend upwardly and outwardly from the two side elements, respectively; and wherein the seat pan comprises a suspension member having hooks engaging a top of the cross bar to support the suspension member in the seat pan.

9. The vehicle seat base of claim 8, wherein the seat pan defines at least one retaining hook on at least one of the recessed features.

10. The vehicle seat base of claim 8, wherein at least one of the recessed features is positioned on an outboard side of the seat pan.

11. The vehicle seat base of claim 8, further comprising:
a front cross bar extending between the two side members, the front cross bar configured to flex.

12. The vehicle seat base of claim 9, wherein the front cross bar is configured to deflect greater than about 30 mm in a vertical deflection before breakage.

* * * * *